Oct. 29, 1957 J. G. SPRACKLEN 2,811,581

TELEVISION RECEIVER SCANNING SYSTEM

Filed Nov. 17, 1952 3 Sheets-Sheet 1

JOHN G. SPRACKLEN
*INVENTOR.*

BY Francis W. Crotty

HIS ATTORNEY.

JOHN G. SPRACKLEN
*INVENTOR.*
BY Francis W. Crotty
HIS ATTORNEY.

TELEVISION RECEIVER SCANNING SYSTEM

Filed Nov. 17, 1952 3 Sheets-Sheet 3

JOHN G. SPRACKLEN
*INVENTOR.*
BY Francis W. Crotty
HIS ATTORNEY.

United States Patent Office 2,811,581

Patented Oct. 29, 1957

2,811,581

TELEVISION RECEIVER SCANNING SYSTEM

John G. Spracklen, Chicago, Ill., assignor to Zenith Radio Corporation, a corporation of Illinois Application November 17, 1952, Serial No. 320,365

10 Claims. (Cl. 178—7.5)

This invention relates to television receivers and more particularly to scanning systems for use in such receivers.

In United States Patent 2,606,300, issued August 5, 1952, for "Electron-Discharge Device" and in the copending application of Robert Adler, Serial No. 267,826, filed January 23, 1952, for "Frequency Controllable Oscillating Systems," both assigned to the present assignee, there are disclosed and claimed a novel electron-discharge device and system for use as a synchronizing-control arrangement in a television receiver or the like. In the preferred embodiment, a two-section tube is employed, the first or control section operating as a synchronizing-signal clipper and balanced line-frequency phase-detector to develop between a pair of anodes a balanced unidirectional control voltage indicative of the phase difference between the local line-frequency oscillator and the incoming line-frequency synchronizing-signal pulses. In the second or power section of the tube, an electron beam is simultaneously subjected to a sinusoidal magnetic-deflection field energized from the line-frequency sweep output and to a slow lateral displacement in accordance with the balanced unidirectional control voltage developed between the two phase-detector anodes in the first section. In this manner, the duty cycles of two final anodes in the second section of the tube are caused to vary in accordance with the unidirectional control potential developed between the phase-detector anodes of the first section. Either the leading edge or the trailing edge of the developed quasi-square wave is employed to drive the line-frequency sweep system. The output voltage appearing at the phase-detector anodes may be combined and integrated to provide field-frequency output pulses for controlling the field-frequency sweep system, or a separate anode may be provided for this purpose. Thus, a single tube, together with a small number of external circuit elements, performs the several functions of synchronizing-signal separator, automatic-frequency-control (AFC) phase-detector, line-frequency oscillator, and reactance tube, providing a substantial saving in comparison with conventional systems which usually employ three or more tubes to perform these functions.

In the copending applications of Robert Adler, Serial No. 242,509, filed August 18, 1951, for "Television Receiver," and Serial No. 314,373, filed October 11, 1952, for "Television Receiver" both assigned to the present assignee, there are disclosed and claimed a novel tube and system for obtaining both noise-immnue synchronizing-signal separation and automatic gain control generation. In a preferred form of this system, a sheet-like electron beam of substantially rectangular cross-section is projected through a deflection-control system toward a target electrode which is provided with a pair of apertures and is followed by plate electrodes for collecting space electrons which pass through the respective apertures. Detected composite video signals are applied to the deflection-control system in such a manner that space electrons are permitted to pass through the two apertures in the target electrode only during synchronizing-pulse intervals. Moreover, extraneous noise impulses, which are generally of much greater amplitude than the desired synchronizing pulses, cause transverse deflection of the beam beyond the apertures so that space electron flow to the plate electrodes is again interrupted. One of the plate electrodes is employed to derive noise-immune output current pulses corresponding to the synchronizing-pulse components of the applied composite video signals, and these output pulses drive the line-frequency and field-frequency scanning systems. The other plate electrode is utilized to develop an automatic gain control (AGC) potential which is then applied in a conventional manner to one or more of the early receiving stages. In order to insure the establishment of synchronizing-pulse output at the first plate electrode whenever the automatic gain control system goes into effect to limit further growth of the signal, the two apertures in the target electrode are disposed in overlapping alignment in a direction parallel to the plane of the sheet-like electron beam. In addition to providing noise-immune synchronizing-signal separation and automatic gain control generation in a single tube, this system has the important advantage of automatically establishing the correct synchronizing-signal clipping level for all normal receiver-input signal levels, with the result that incorrect synchronizing-pulse clipping which might otherwise be caused by drift or misadjustment of the automatic gain control circuits is effectively precluded.

In the copending application of John G. Spracklen, Serial No. 246,768, filed September 15, 1951, for "Television Receiver," and assigned to the present assignee, there are disclosed and claimed a still further novel tube and system for combining certain features embodied in the systems of the aforementioned Adler applications. To achieve this objective, the requirement for a magnetic deflection field is obviated by modifying the tube construction and external circuit connections to provide phase detection by means of a gating action. To this end, the single synchronizing-signal output plate of the last mentioned Adler tube is replaced by at least a pair of phase-detector plate electrodes symmetrically positioned behind the sync clipping aperture. A balanced comparison signal is applied between the two phase-detector plates from the line-frequency scanning system of the receiver. When the desired condition of phase synchronism exists, the phase-detector plates are maintained at equal average potentials; however, upon deviation from synchronism, a balanced control potential indicative of the magnitude and direction of the deviation is developed. In accordance with a preferred embodiment, this system is employed in conjunction with a deflection tube oscillator, and the phase-detector plate electrodes are direct-coupled to the deflection electrodes of the oscillator to effect automatic frequency control.

In both the first-mentioned Adler system and in the Spracklen system, a beam deflection tube or electrode system is employed in conjunction with a long feedback loop through the line-frequency scanning system as the line-frequency scanning oscillator, with automatic frequency control of the line-frequency scansion being effected by applying a balanced unidirectional control potential to a pair of deflection elements to modify the duty cycle of the output wave. The output wave is then differentiated to provide trigger pulses for the conventional discharge tube in the line-frequency sweep system.

It is a primary object of the present invention to provide a further simplification in the scanning circuits of a television receiver.

Yet another object is to incorporate an added function in the power section of the special purpose electron-discharge devices described and claimed in the above-identified copending applications.

Still a further object of the invention is to provide a combined deflection-tube oscillator and reactance tube which also functions as the discharge tube in the sweep system of a television receiver.

A television receiver constructed in accordance with the present invention comprises an image-reproducing device and an associated scanning system. Means are coupled to the scanning system for developing a comparison signal in fixed phase relation with the scansion of the image-reproducing device. Phase comparison means are coupled to a source of composite video signals and to the comparison signal developing means to generate a unidirectional control potential indicative of the phase relation between the synchronizing-signal components and the scansion. The receiver further comprises an electron-discharge device including a cathode for projecting an electron stream, a control system, and an anode system including an output electrode. Both the unidirectional control potential and a periodic signal having a fixed phase relation with the scansion are applied to the control system of the electron-discharge device. A wave-shaping network including an energy storage device is coupled to the output electrode, and a charging circuit is provided for the wave-shaping network, the energy storage device being periodically discharged through the electron stream of the electron-discharge device. Further means are provided for coupling the wave-shaping network to the scanning system to control the scansion in accordance with the periodic discharge of the energy storage device.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Throughout the specification and the appended claims, the term "composite television signal" is employed to describe the received modulated carrier signal, while the term "composite video signal" is employed to denote the varying unidirectional or unipolar signal after detection. The term "direct-coupling" is descriptive of a circuit coupling capable of transmitting direct or unidirectional voltages, and a "direct connection" is a direct-coupling of substantially zero impedance.

Figure 1:
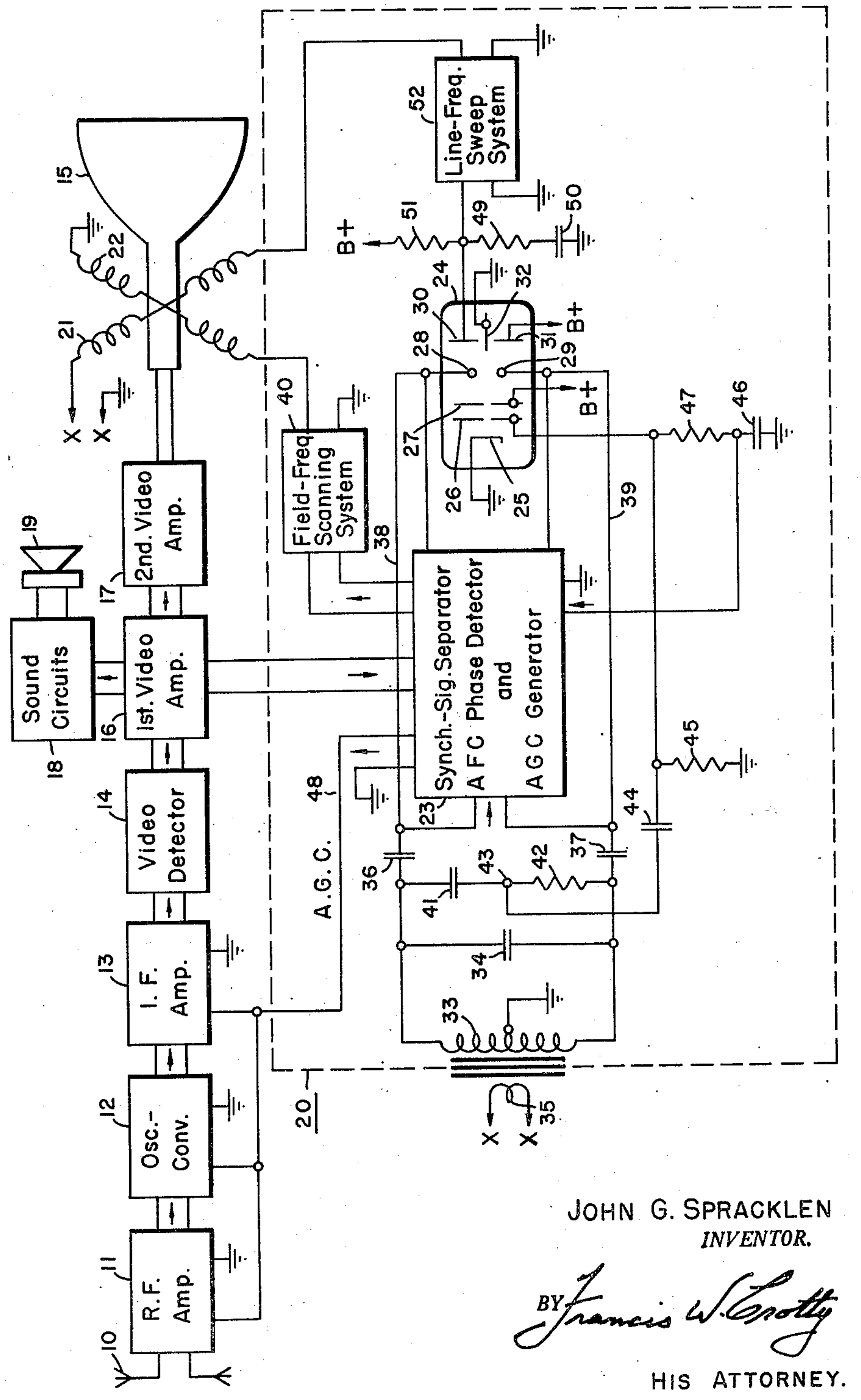
Figure 1 is a schematic diagram of a television receiver embodying the present invention.

In the television receiver of Figure 1, incoming composite television signals are received by an antenna 10 and impressed on a radio-frequency amplifier 11. The amplified composite television signals from radio-frequency amplifier 11 are supplied to an oscillator-converter 12, and the intermediate-frequency output signals from oscillator-converter 12 are impressed on an intermediate-frequency amplifier 13. The amplified intermediate-frequency composite television signals are demodulated by a video detector 14, and the video-signal components of the resulting composite video signals are impressed on the input circuit of an image-reproducing device 15, such as a cathode-ray tube, after amplification by first and second video amplifiers 16 and 17. Intercarrier sound signals developed in the output circuit of first video amplifier 16 are impressed on suitable sound circuits 18, which may comprise a limiter-discriminator and audio and power amplifier stages, and the amplified audio signals are impressed on a loudspeaker 19 or other sound-reproducing device.

Composite video signals from first video amplifier 16 are supplied to a synchronizing and automatic gain control system 20 embodying the present invention, and suitable line-frequency and field-frequency scanning signals are impressed on appropriate line-frequency and field-frequency deflection coils 21 and 22 associated with image-reproducing device 15.

Synchronizing and automatic gain control system 20 comprises a synchronizing-signal separator, automatic-frequency-control phase detector, and automatic-gain-control generator collectively represented by the unit 23 which may be of any known construction. The system further comprises a beam deflection tube 24 of conventional construction including a cathode 25, a focusing electrode 26, and an accelerating electrode 27 constituting an electron gun for projecting a focused electron beam. A pair of electrostatic-deflection electrodes 28 and 29 are provided on opposite sides of the path of the beam, and an anode system includes a pair of plate-like anodes 30 and 31 having active portions on opposite sides of the undeflected path of the beam, anodes 30 and 31 being separated by a suppressor vane 32.

First video amplifier 16 is coupled to the synchronizing-signal separator and automatic-gain-control generator elements of unit 23. At the same time, a parallel-resonant circuit comprising a coil 33 having a grounded center tap and tuned to the line-scanning frequency by means of a condenser 34 is energized by means of a feedback coil 35 coupled in series with line-frequency deflection coil 21, as indicated by the terminal designations X—X. Tuned circuit 33, 34 constitutes a means for developing a comparison signal having a predetermined phase relation with respect to the line-frequency scansion of image-reproducing device 15, and the balanced comparison signal is applied through condensers 36 and 37 to the phase detector element of unit 23 and also to deflectors 28 and 29 of beam deflection tube 24. The AFC phase detector develops a balanced unidirectional control potential indicative of the phase relation between the comparison signal and the incoming synchronizing components from first video amplifier 16, and this balanced AFC potential is also applied to deflectors 28 and 29 by means of the same conductive connections 38 and 39 through which the comparison signal is applied. Field-frequency synchronizing components from the synchronizing-signal separator element of unit 23 are supplied to a field-frequency scanning system 40 which in turn provides suitable deflection currents to field-frequency deflection coil 22.

Cathode 25 and suppressor vane 32 of beam deflection tube 24 are grounded, while accelerating electrode 27 and passive anode 31 are directly connected to a suitable source of positive unidirectional operating potential, conventionally designated B+. A phase-shifting network comprising a condenser 41 and a resistor 42 is connected in series across tuned circuit 33, 34, and the junction 43 between condenser 41 and resistor 42 is coupled to focusing electrode 26 of beam deflection tube 24 by means of a coupling condenser 44 and a shunt resistor 45. Focusing electrode 26 is also returned to the ungrounded terminal of a storage condenser 46 through a resistor 47, and storage condenser 46 in turn is coupled to the AGC generator element of unit 23. A unidirectional control potential indicative of the amplitude variations of the composite video signals from first video amplifier 16 is developed by the AGC generator element of unit 23 and applied to one or more of the receiving circuits comprising radio-frequency amplifier 11, oscillator-converter 12 and intermediate-frequency amplifier 13 by means of an AGC lead 48.

Output anode 30 of beam deflection tube 24 is coupled to a wave-shaping network comprising series-connected resistance and capacitance elements 49 and 50. A load resistance 51 coupled between B+ and anode 30 completes a charging circuit for the energy storage device 50 of wave-shaping network 49, 50. Output anode 30 is also coupled to a line-frequency sweep amplifier 52 which may be of conventional construction and which in turn supplies suitable deflection currents to line-frequency deflection coil 21.

In operation, the synchronizing-signal components of the applied composite video signals are stripped from the video-signal components in the synchronizing-signal separator element of unit 23. The field-frequency synchronizing components are applied directly to field-frequency scanning system 40, which may be of completely conventional construction. The line-frequency synchronizing components are applied to an automatic-frequency-control phase detector, preferably of the balanced variety, where they are compared in phase with the comparison signal developed by tuned circuit 33, 34 to develop a unidirectional control potential indicative of the phase relation between the incoming line-frequency synchronizing components and the line-frequency scansion of image-reproducing device 15.

Feedback coil 35 and oscillatory circuit 33, 34 also constitute elements in the feedback loop of the line-frequency oscillator which also comprises beam deflection tube 24 and line-frequency sweep amplifier 52. The beam projected by electron gun 25, 26, 27 is subjected to a periodic lateral deflection by virtue of the application of the comparison signal from tuned circuit 33, 34 to deflectors 28 and 29, so that the beam is alternately switched from output anode 30 to passive anode 31 and back in synchronism with the comparison signal. At the same time, the balanced unidirectional control potential from the AFC phase detector element of unit 23 is also applied between deflectors 28 and 29 to vary the duty cycle of output anode 30 accordingly.

In the systems of the above-described copending applications, the output wave developed at the output anode of the beam deflection oscillator is differentiated to provide suitable trigger pulses for a conventional discharge tube coupled to wave-shaping network 49, 50. However, in accordance with the present invention, the discharge tube is eliminated and its function is incorporated in the operation of beam deflection tube 24. To accomplish this end, wave-shaping network 49, 50 is directly connected to output anode 30, and a periodic gating signal in phase quadrature with the line-frequency scansion is applied to focusing electrode 26, which serves as an intensity-control electrode, to interrupt the flow of space current except during a minor portion of each scanning cycle at the appropriate time to discharge energy storage device 50 through the electron beam. In the illustrated embodiment, the gating signal is derived from a phase-shifting network 41, 42 coupled in parallel with tuned circuit 33, 34; however, it is also possible to apply integrated positive-polarity flyback pulses from a tap on the primary winding or from a separate secondary winding of the line-frequency sweep transformer if desired. Derivation of the gating signal from the sweep transformer provides the advantage of insuring substantially uniform discharge-pulse width regardless of the adjustment of the line-frequency hold control, as well as providing additional feedback to assure the starting of oscillation in the line-frequency scanning system. Application of the gating signal to focusing electrode 26 also prevents the generation of spurious output pulses in phase opposition to the desired pulses, since the electron beam is interrupted during the major portion of each scanning cycle between the desired discharge times. Application of the gating signal to focusing electrode 26 further prevents undesirable beam current flow to deflectors 28 and 29, as described and claimed in the copending application of John G. Spracklen, Serial No. 320,866, filed concurrently herewith, for "Television Receiver," and assigned to the present assignee.

Thus, energy storage device 50 is charged at an exponential rate by the application of positive unidirectional operating potential from B+ through resistors 51 and 49 during a major portion of each scanning cycle, and the charge thus developed across condenser 50 is periodically dissipated through the electron beam of electron-discharge device 24 which is periodically gated on for short intervals at the appropriate times. Consequently, a peaked sawtooth voltage wave is developed across wave-shaping network 49, 50 and is applied to line-frequency sweep amplifier 52 to generate a sawtooth scanning current for application to line-frequency deflection coils 21.

If desired, focusing electrode 26 may also be employed to generate a negative-polarity unidirectional potential of substantially constant magnitude for superposition on the automatic gain control voltage developed by the AGC generator element of unit 23, in the manner described and claimed in the last-mentioned copending Spracklen application.

Figure 2:
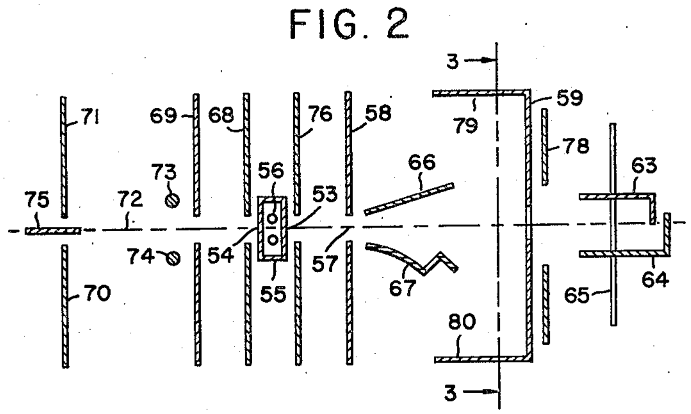
Figure 2 is a cross-sectional view of the electrode system of an electron discharge device employed in the receiver of Figure 1.
Figure 3:
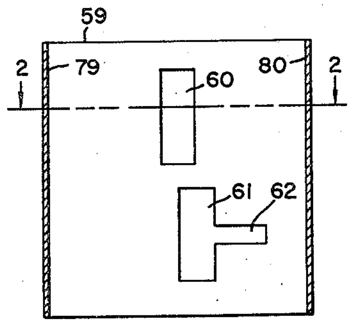
Figure 3 is a cross-sectional view taken along the line 3—3 of Figure 2.

While the combined line-frequency oscillator, reactance tube, and discharge tube 24 of the sysstem of Figure 1 may be employed in connection with synchronizing-signal separator and automatic-frequency-control phase detector elements of conventional construction, the invention affords particular advantage when employed in a scanning system comprising a special-purpose electron discharge device of the type described in certain of the above-identified copending applications and illustrated in cross-section in Figures 2 and 3. In Figure 2, two separate sheet-like electron beams of substantially rectangular cross-section are projected from opposite electron-emissive surfaces 53 and 54 of a common elongated cathode 55 which is provided with an indirect heater element 56. In the right-hand or control section of the tube, space electrons originating at emissive surface 53 are projected through a slot 57 in an accelerating electrode 58 toward a target electrode or intercepting anode 59 which is provided with a pair of rectangular apertures or slots 60 and 61, best visualized from the view of Figure 3. Preferably, slots 60 and 61 are arranged in overlapping alignment in a direction parallel to cathode 55, and slot 61 may be provided with a lateral extension 62 for a purpose to be hereinafter described. A pair of receptor electrodes 63 and 64, constituting a first output electrode system, are provided for collectively receiving space electrons which pass through slot 60, and an additional plate electrode 65, constituting a second output electrode system, is provided for receiving space electrons which pass through slot 61. Receptor electrodes 63 and 64 are preferably constructed as "controllector" electrodes each having a deflection-control portion and a collector portion and adapted to be biased at equal positive operating voltages in the manner described and claimed in the copending application of Robert Adler, Serial No. 263,737, filed December 28, 1951, for "Electron-Discharge Device," and assigned to the present assignee. However, output electrodes 63 and 64 may be formed in other manners, for example as a pair of simple transverse collecting plates such as those described in Spracklen application Serial No. 246,768, if desired.

A deflection-control system, illustrated as a pair of electrostatic-deflection electrodes or plates 66 and 67, is provided between accelerating electrode 58 and target electrode 59. Deflectors 66 and 67 extend for the full height of the beam to constitute a single input electrode system associated with both output electrode systems. At least the active deflector 67 is preferably of louvred construction as shown in Figure 2 and described and claimed in the copending application of Robert Adler, Serial No. 277,399, filed March 19, 1952, for "Electron-Discharge Device," and assigned to the present assignee, in order to minimize the amount of beam current drawn by the active deflector under strong impulse noise conditions. The passive or companion deflector 66 may also advantageously be constructed in the same manner (not shown) to avoid deleterious effects of secondary electron emission resulting from impingement of space electrons thereon under certain operating conditions. Preferably the tube is so constructed and operated that the thickness of the beam at the plane of target electrode 59 is less than the width of slot 60.

In the left-hand or power section of the tube, electrons originating at emissive surface 54 are projected through slotted focusing and accelerating electrodes 68 and 69 toward an output system comprising a pair of anodes 70 and 71 respectively having active portions on opposite sides of the tube axis or undeflected path 72 of this second beam. A pair of electrostatic-deflection electrodes 73 and 74 are provided between accelerating electrode 68 and anodes 70 and 71. Anodes 70 and 71 are separated by a suppressor vane 75. The power section of the tube of Figure 2 corresponds to beam-deflection tube 24 of the system of Figure 1.

Those elements thus far described constitute the essential elements of a special-purpose electron tube constructed in accordance with one or more of the above-identified copending applications. However, refinements of this electrode system may be made in accordance with well known practices in the art. Thus, for example, a focusing electrode 76 having a slot narrower than emissive surface 53 of cathode 55 may be interposed between the cathode and accelerating electrode 58 and maintained at or near cathode potential to restrict electron emission to a narrow central portion of the emissive surface. Moreover, it may be advantageous to include one or more suppressor electrodes, such as electrode 78, between intercepting anode 59 and electrodes 63, 64 and 65, and to form target electrode 59 with flanges 79 and 80 directed toward the electron gun comprising cathode 55 and accelerating electrode 58, for the purpose of avoiding spurious effects attributable to secondary electron emission. Further, the particular construction of deflection-control systems 66, 67 and 73, 74 may be varied; for example, one or more of the deflection electrodes may be replaced by plural electrodes biased at different potentials, such as cathode potential and the D. C. supply voltage of the associated apparatus with which the tube is employed. Preferably, however, deflection electrodes 73 and 74 in the left-hand section of the tube are constructed as simple parallel rods or wires to minimize the intercepting area presented thereby to stray electrons. Still further, either or both of the sheet-like electron beams may be split into two or more beams subjected to a common transverse deflection field or to synchronous deflection fields if desired.

The electrode system is mounted within a suitable envelope (not shown) which may then be evacuated and gettered in accordance with well known procedures in the art. The entire structure may conveniently be included in a miniature glass envelope, a number of the electrode connections being made internally of the envelope in a manner to be made apparent, for the purpose of minimizing the number of external circuit connections. Alternatively, the control and power sections may be mounted in separate envelopes.

In operation, deflection plates 66 and 67 are biased to direct the electron beam in the right-hand section of the tube to an electron-impervious portion of target electrode 59, for example, to a solid portion of electrode 59 on the side of aperture 60 nearer deflection plate 66. When an input signal of positive polarity is applied to deflection plate 67, or alternatively when an input signal of negative polarity is applied to deflection plate 66, the beam is deflected at least partially into slots 60 and 61 whenever the input signal exceeds a predetermined amplitude level. During such intervals, current is permitted to flow in the output circuits associated with electrodes 63, 64 and 65, provided these electrodes are maintained at a proper potential to receive electrons, while during other intervals no such current flow can occur. Moreover, when the input signal exceeds a predetermined higher amplitude, the beam is deflected beyond slot 60 of intercepting electrode 59, and current flow to output electrodes 63 and 64 is again interrupted. At still greater input-signal amplitudes, the current flowing to output electrode 65 is first diminished as the beam is deflected into extension 62 of slot 61 and then extinguished as the beam sweeps beyond extension 62.

Figure 4:
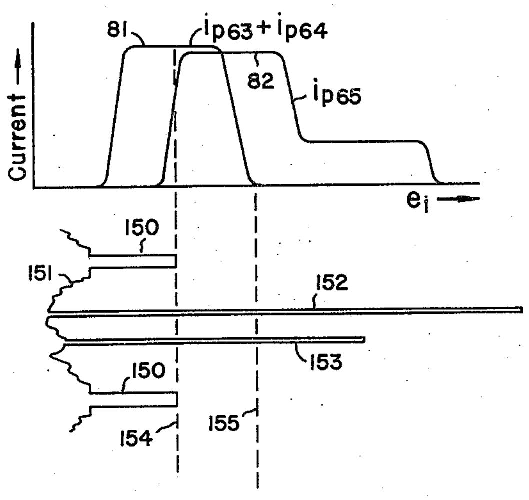
Figures 4 and 5 are graphical representations useful in understanding the operation of the present invention.

The transfer characteristics of the input deflection-control system 66, 67 with respect to the output system comprising electrodes 63 and 64 and with respect to output electrode 65 are represented by curves 81 and 82 respectively of Figure 4. Curve 81 represents the total current ($i_{p63}+i_{p64}$) flowing to controllector electrodes 63 and 64 as a function of the input voltage $e_1$ applied to deflection-control system 66, 67. Curve 82 shows the current $i_{p65}$ to output electrode 65 as a function of the input voltage $e_1$. The magnitudes and shapes of curves 81 and 82 are determined by the geometry of slots 60 and 61; the particular operating characteristics illustrated in Figure 4 are those obtained for a specific embodiment and are not intended to be construed as representing required relative or absolute magnitudes or shapes.

Figure 5:
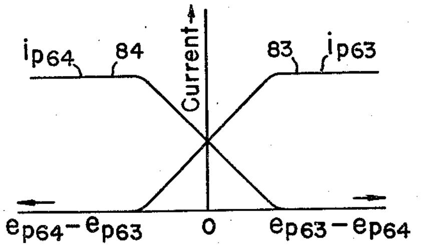

Receptor electrodes 63 and 64, which each comprise electrically connected control and collector portions and are therefore termed "controllector" electrodes, are disposed in effectively symmetrical relation with respect to an axis passing through the center of slot 60 and, in operation, are preferably biased to equal positive unidirectional operating potentials. The collector portions conjointly define a collector system for collectively receiving substantially all electrons projected through slot 60, and the control portions serve as a deflection-control system responsive to applied signals for controlling the space current distribution between the collector portions. The control characteristics of controllector electrodes 63 and 64 are shown qualitatively in Figure 5, in which curve 83 represents the current $i_{p63}$ to electrode 63 and curve 84 the current $i_{p64}$ to electrode 64 as functions of the potential difference $e_{p63}-e_{p64}$ between the two controllector electrodes. As described in application Serial No. 263,737, it has been found that the current distribution between controllector electrodes 63 and 64 may be made substantially independent of the position at which the beam enters slot 60 of target electrode 59. This desirable condition may be obtained over a broad range of positive bias potentials for controllector electrodes 63 and 64, as for example between one-fifth and one-third of the voltage applied to target electrode 59. When so operated, target electrode 59 and controllector electrodes 63 and 64 form an electrostatic lens for focusing the beam, whenever it passes through slot 60, to converge on the collector system at a location substantially independent of the input signal applied between deflection-control electrodes 66 and 67. Thus, in practice, it has been found that the operating characteristics of Figure 5 remain substantially unchanged throughout a fairly large range of positive bias potentials for controllector electrodes 63 and 64. Curves 83 and 84 intersect symmetrically, for an effectively symmetrical physical construction, and the current is divided equally between electrodes 63 and 64 when their potentials are equal. Secondary electrons originating at controllector electrodes 63 and 64 are effectively trapped in the enclosed region between these electrodes.

The left-hand portion of the structure of Figure 2 constitutes a conventional deflection-control electrode system. The electron beam projected through slot 68 of accelerating electrode 69 is directed either to anode 70 or to anode 71 in accordance with the instantaneous potential difference between electrostatic-deflection electrodes 73 and 74. If a sinusoidal signal wave is applied between deflection electrodes 73 and 74, the beam is caused cyclically to sweep back and forth transversely across axis 72 and is thereby switched back and forth between anodes 70 and 71. Consequently, oppositely phased output signals are produced in load circuits respectively associated with anodes 70 and 71; in the preferred embodiment of the invention, only one output signal is required, and either anode 70 or anode 71 is employed to develop the output signal while the other is directly connected to B+.

Figure 6:
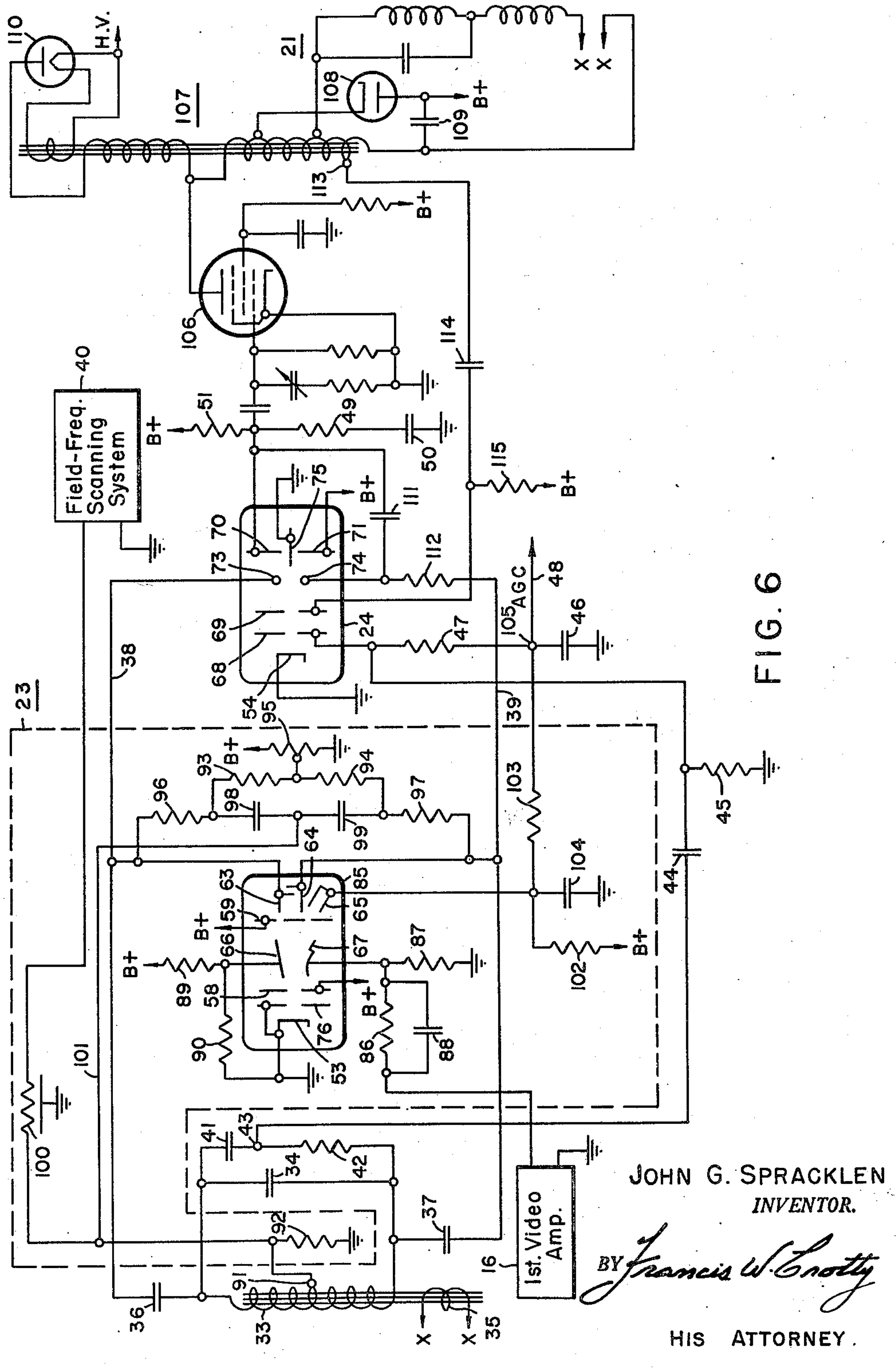
Figure 6 is a schematic circuit diagram of a portion of a television receiver embodying a preferred form of the invention.

While the invention is not restricted in utility to systems incorporating special purpose electron tubes of the type shown and described in connection with Figures 2–5, it is possible with the use of such special purpose tubes to accomplish several functions in a simple system incorporating but one or two electron-discharge devices, as compared with the four or five previously required to perform the same functions. In fact, it has been found that superior performance may be obtained while at the same time effecting a substantial cost reduction and circuit simplification. Consequently, a system of this type is schematically illustrated in Figure 6 as the preferred environment for the present invention. In Figure 6, two separate electron-discharge devices, corresponding respectively to the control and power sections of the device of Figures 2 and 3, are employed, and the cathodes of the two devices are identified by the reference numerals applied to the opposite emissive surfaces of cathode 55 in Figure 2; in other respects, the reference numerals designating the electrodes of the two devices correspond to those employed in describing the combined tube of Figure 2. The portion of the circuit of Figure 6 corresponding to unit 23 of the receiver of Figure 1 is indicated in dashed outline bearing the same reference numeral, and other portions of the circuit of Figure 6 shown also in Figure 1 are designated by corresponding reference numerals.

Electron-discharge device 85 of the receiver of Figure 6 is of a construction corresponding to the right-hand or control section of the tube shown and described in connection with Figures 2–5. Composite video signals from first video amplifier 16 are supplied to deflection plate 67, hereinafter termed the active deflector, of device 85 by means of a voltage-divider network comprising resistors 86 and 87, active deflector 67 being connected to the junction between resistors 86 and 87. A condenser 88 is connected in parallel with resistor 86. Cathode 53 of device 85 is connected to ground. Accelerating electrode 58 and target electrode 59 are connected together (preferably internally of the envelope) and to a suitable source of positive unidirectional operating potential, conventionally designated B+. Deflection plate 66, hereinafter termed the companion deflector, is connected to a tap on a voltage divider comprising resistors 89 and 90 connected between B+ and ground.

Controllector electrodes 63 and 64 of device 85 are respectively coupled to opposite terminals of coil 33, having a center tap 91 which is returned to ground through a resistor 92, by means of condensers 36 and 37. A conductive load impedance, such as a pair of equal resistors 93 and 94, is connected between electrodes 63 and 64, the junction between resistors 93 and 94 being connected to a suitable positive bias potential source, as by connection to a tap on a voltage divider 95 connected between B+ and ground. Suitable anticipatory and anti-hunt networks, such as those constituted by small resistors 96 and 97 and large condensers 98 and 99, are also provided. Center tap 91 of coil 33 is also coupled through an integrator 100 to field-frequency scanning system 40, and the junction of condensers 98 and 99 is connected through lead 101 to field-frequency load resistor 92 to stabilize the amplitude of the field-frequency output pulses.

Plate electrode 65 is connected to B+ through a resistor 102 and is also returned through series-connected resistors 103 and 47 to focusing electrode 68 of beam deflection oscillator tube 24 which serves as a source of negative unidirectional operating potential which may be about 50 volts negative with respect to cathode 54. An integrating condenser 104 is connected between plate electrode 65 and ground. The junction 105 between resistors 103 and 47 is connected to the automatic gain control (AGC) lead 48 and is shunted by filter condenser 46.

The schematic diagram of Figure 6 also includes a line-frequency sweep amplifier and output transformer, complete with high-voltage rectifier and bootstrap circuit, of conventional construction. Specifically, the peaked sawtooth voltage wave appearing across wave-shaping network 49, 50 is applied through a capacitive voltage divider to the input grid of a pentode or beam power amplifier tube 106 of suitable construction, as for example type 6BQ6. The plate or output electrode of the sweep amplifier tube 106 is coupled to the primary winding of an output transformer 107, the line-frequency deflection yoke 21 being coupled across a portion of the primary winding of output transformer 107. A bootstrap circuit, comprising a diode rectifier 108 and a storage condenser 109 connected across a portion of the primary winding of output transformer 107, is also provided to provide an effective increase in the unidirectional power supply voltage, in a well known manner. Moreover, output transformer 107 is provided with a high-voltage secondary winding to which is coupled a diode rectifier 110 for developing high voltage for application to the final anode of the image-reproducing device. This portion of the circuit is of conventional construction, and the details of construction and operation are well known in the art.

In accordance with an additional feature of the present invention, positive or regenerative feedback is provided, either from output anode 70 itself or from some subsequent point in the line-frequency scanning system, to a beam-controlling electrode of beam deflection oscillator tube 24. Specifically, in the illustrated embodiment, output anode 70 is coupled to deflector 74 by means of a coupling condenser 111, a suitable resistor 112 being inserted in series with lead 39 and deflector 74. Moreover, accelerating electrode 69 of beam deflection tube 24 is positively pulsed by means of a circuit extending from a tap 113 on the primary winding of output transformer 107 through a coupling condenser 114 to accelerating electrode 69, the latter being returned to B+ through a dropping resistor 115.

If desired, either the tube structure or the external circuitry, or both, may be modified to compensate for decentering of the reproduced image attributable to the unique phase relations between the incoming synchronizing pulses and the scanning signals encountered in the present system, as described and claimed in the copending application of Robert Adler, Serial No. 272,200, filed February 18, 1952, for "Television Receiver," and assigned to the present assignee. Weak signal compensation may also be provided in the manner described and claimed in the copending application of Robert Adler, Serial No. 304,698, filed August 16, 1952, for "Television Receiver" and also assigned to the present assignee.

The construction and operation of the synchronizing and automatic gain control system of Figure 6 are generally similar to those disclosed and claimed in certain of the above-identified copending applications and will first be described in the more fundamental aspects as background for an understanding of the present invention. Positive-polarity composite video signals, including the direct-voltage components, from the output circuit of first video amplifier 16 are applied to active deflector 67 by means of the voltage divider network comprising resistors 86 and 87 and condenser 88. Deflectors 66 and 67 are so biased that the beam projected through aperture 57 of accelerating electrode 58 is normally directed to an electron-impervious portion of target electrode 59, as for instance, to a solid portion of target electrode 59 on the side of apertures 60 and 61 nearer deflection plate 66, or to the left of aperture 60 in the view of Figure 3. Application of the positive-polarity composite video signals to active deflector 67 causes a transverse deflection of the beam in accordance with the instantaneous signal amplitude. The operating potentials for the various electrodes are so adjusted that different longitudinal portions of the beam are respectively deflected entirely into aperture 60 and partially into aperture 61 of intercepting anode 59 in response to the synchronizing-signal components of the applied composite video signals; the beam is entirely intercepted by target electrode 59 and/or deflection plate 66 during video-signal intervals. As a consequence, beam current is only permitted to flow to electrodes 63, 64 and 65 during synchronizing-pulse intervals.

Device 24 serves as the power element of a line-frequency oscillator in the line-frequency scanning system. Oppositely phased sinusoidal signals are applied to deflection electrodes 73 and 74 by means of coil 33 and condenser 34 which are tuned to the line-scanning frequency to operate as a ringing circuit or filter excited by means of coil 35 inserted in series with the line-frequency deflection coil 21. Consequently, the beam in device 24 is caused to sweep back and forth between anodes 70 and 71, so that an output voltage is developed across resistor 51. In the systems described in the above-mentioned applications, this output voltage is of rectangular waveform and is differentiated by means of a series condenser and a shunt resistor, and the resulting positive-polarity pulses are employed to trigger the discharge tube of the line-frequency sweep system.

At the same time, the same oppositely phased sinusoidal voltage waves applied to deflection electrodes 73 and 74 are impressed on controllector electrodes 63 and 64, respectively, in device 85. As previously explained, current flow to controllector electrodes 63 and 64 is restricted to synchronizing-pulse intervals by virtue of the geometry of target electrode 59. The current distribution between electrodes 63 and 64 is dependent upon the instantaneous potential difference between these electrodes during the synchronizing-pulse intervals.

The oppositely phased sinusoidal signals developed at the terminals of coil 33 by excitation of tuned circuit 33, 34 in response to the sweep current through coil 35 serve as comparison signals in a balanced phase-detector. If the comparison signals are properly phased with respect to the incoming line-frequency synchronizing-signal pulses, the instantaneous potentials of controllector electrodes 63 and 64 are equal at the time of the arrival of each synchronizing pulse, and the space current passing through aperture 60 is equally divided between electrodes 63 and 64, with the result that no unidirectional control potential difference is developed between the controllector electrodes. On the other hand, if the comparison signals and the incoming line-frequency synchronizing-signal pulses are not in proper phase synchronism, the instantaneous potentials of the two controllector electrodes 63 and 64 at the time of arrival of each line-frequency synchronizing-signal pulse are different, so that the beam currents collected by electrodes 63 and 64 are unequal and a unidirectional control signal is developed between the controllector electrodes. Since controllector electrodes 63 and 64 are directly connected to deflection electrodes 73 and 74 respectively in device 24, the beam in device 24 is accelerated or retarded in its progress from anode 70 to anode 71 and back in response to the unidirectional control signal. As a result, the duty cycle of anode 70 is altered in accordance with the unidirectional control potential difference between electrodes 33 and 34, and phase synchronism of the line-frequency sweep system with the incoming line-synchronizing pulses is assured.

In order to obtain the desired automatic-frequency-control action, it is essential that a condition in which the comparison signals lag the incoming synchronizing-signal pulses result in an increase in the frequency of the local oscillator comprising device 24, line-frequency sweep system 67, and feedback circuit 35, 33. This operation is insured by the common direct connections for both the sinusoidal comparison signals and the unidirectional AFC potential from controllector electrodes 63 and 64 to deflection electrodes 73 and 74 respectively. It is possible, for a given set of circuit connections, that the system may fail to oscillate altogether due to incorrect phasing of the comparison signals and the triggering pulses for the line-frequency sweep system; this condition may be corrected by merely reversing the terminal connections of feedback coil 35 or of coil 33. Proper pull-in action is automatically insured for any condition for which oscillation is obtained.

To obtain field-frequency synchronization, the output currents to controllector electrodes 63 and 64 are effectively combined by means of resistor 92 connected in the common ground return for controllector electrodes 63 and 64. The combined output appearing across resistor 92 is integrated by integrator 100 to provide a control signal for field-frequency scanning system 40. The beam current through aperture 60, representing the clipped sync pulses, is first used in its entirety to provide a balanced line-frequency control potential, and then again in its entirety to synchronize the field scansion. The use of an output load impedance connected in a common return circuit for the phase-detector electrodes for deriving field-frequency driving pulses is specifically described and claimed in the copending application of Robert Adler, Serial No. 260,221, filed December 6, 1951, for "Synchronizing Control Apparatus," and assigned to the present assignee. It is of course also possible to employ a separate plate electrode for the sole purpose of developing field-frequency synchronizing-signal pulses for application to the field-frequency scanning system, as described in Spracklen application Serial No. 246,768.

Plate electrode 65 develops a unidirectional control potential indicative of the peak amplitude of the composite video signals for application to the receiving circuits preceding the video detector to effect automatic gain control of the receiver. Plate electrode 65 is conditioned to receive substantially all beam current directed thereto by virtue of its connection to B+ through resistor 102. During video-signal intervals, however, the input signal amplitude at active deflector 67 is not sufficient to cause deflection of space electrons through slot 61, with the result that space current is only permitted to flow to plate electrode 65 during synchronizing-pulse intervals. Noise pulses occurring during either synchronizing-pulse intervals or video-signal intervals are generally of much greater amplitude than the peak amplitude of the synchronizing pulses and thus cause deflection of the beam beyond slot 61. This results in an aperture-gating characteristic, as distinguished from the now-familiar time-gated automatic gain control system, with the automatic gain control potential being dependent substantially only on the peak amplitude of the synchronizing pulses. Series-connected resistors 102, 103 and 47 constitute a voltage divider between B+ and the negative voltage developed by the diode plate action of focusing electrode 68 and are so proportioned that, in the absence of space current to plate electrode 65, the potential of AGC lead 48 is at or near ground, depending upon the required bias voltage for the receiving circuits. The potential of junction 105 varies in accordance with the space current to plate electrode 65 and is then filtered by condenser 46 and applied to AGC lead 48 to effect automatic gain control of the receiver. In other words, plate electrode 65 is coupled to an intermediate point on the voltage divider comprising resistors 102, 103 and 47 to cause the potential at another intermediate point 105 to vary in response to variations in the peak amplitude of the synchronizing pulses applied to active deflector 67 from first video amplifier 16. Certain features of the automatic gain control system are specifically disclosed and claimed in the copending application of John G. Spracklen, Serial No. 281,708, filed April 11, 1952, for "Television Receiver," and assigned to the present assignee.

Certain important advantages of the system may best be understood from a consideration of Figures 2–4. Since aperture 60 in intercepting anode 59 has definite fixed boundaries, it is apparent that deflection of the beam beyond aperture 60 results in interception thereof by anode 59. Consequently, extraneous noise pulses, which are generally of much larger amplitude than any desired component of the composite video signals, are not translated to controllector electrodes 63 and 64, and loss of synchronization due to extraneous impulse noise is substantially precluded. This operation is apparent from operating characteristic 81 of Figure 4. When composite video signals comprising synchronizing-pulse components 150 and video-signal components 151 are impressed on active deflection plate 67, extraneous noise pulses 152, 153 which are of greater peak amplitude than the synchronizing-pulse components by an amount exceeding the voltage represented by the spacing between vertical lines 154 and 155, result in deflection of the beam beyond aperture 60; consequently, these noise pulses are not translated to the output circuits associated with controllector electrodes 63 and 64, and substantial noise immunity is achieved. Aperture 60 is preferably of constant length in a direction parallel to cathode 55, in order to provide output current pulses of constant amplitude for application to scanning system 40 and to insure proper AFC action in spite of such rapid fluctuations in the amplitude of the synchronizing pulses as are occasionally encountered.

The operation of the automatic gain control system may perhaps best be understood by a consideration of operating characteristic 82 of Figure 4. Space electrons are permitted to pass to plate electrode 65 only when the electron beam is laterally deflected at least partially into aperture 61. In an equilibrium condition, the deflection-control system is so biased that the peaks of the synchronizing-signal pulses are impressed on the rising portion of characteristic 82, as indicated by vertical line 154. When the signal amplitude increases, the peaks of the synchronizing pulses 150 instantaneously extend further to the right, and the space current to plate electrode 65 is increased. This results in an increase in the negative unidirectional control potential applied to the receiving circuits, thus reducing the gain of these circuits and thereby restoring the amplitude of the input signal applied to active deflection plate 67 to the equilibrium value indicated in the drawing. On the other hand, if the signal amplitude instantaneously decreases, the negative gain-control potential decreases and the gain of the receiving circuits is increased to restore equilibrium. Noise pulses 152 of sufficient amplitude to swing the beam beyond slot extension 62 are prevented from contributing materially to the automatic gain control potential by virtue of the finite boundaries of aperture 61. Noise pulses of lesser amplitude than pulse 152, such as pulse 153, contribute only very slightly to the automatic gain control potential by virtue of the restricted access to plate electrode 65 afforded by slot extension 62. Consequently, the aperture gating characteristic 82 of the AGC system provides substantial noise immunity which in practice has been found favorably comparable with that obtained by the use of conventional time-gated automatic gain control systems. Extension 62 of slot 61 is provided for the purpose of avoiding paralysis of the AGC system, as described in application Serial No. 242,509.

Since it is desirable for the synchronizing current pulses developed at controllector electrodes 63 and 64 to be of constant amplitude, it is preferred that the peaks of the synchronizing-pulse components 150 be impressed on characteristic 81 at a constant-current region of that characteristic; in other words, the synchronizing-pulse components of the applied composite video signals should cause deflection of the upper portion of the beam entirely into aperture 60. At the same time, because of the automatic gain control action, the peaks of the synchronizing-pulse components 150 are normally superimposed on a sloping portion of characteristic 82; in other words, the synchronizing-pulse components of the applied composite video signals cause deflection of the lower portion of the beam only partially into aperture 61. By disposing apertures 60 and 61 in overlapping or staggered alignment in a direction parallel to cathode 55, as illustrated in Figure 3, it is insured that whenever the automatic gain control action establishes the equilibrium condition illustrated by the graphical representation of Figure 4, synchronizing current pulses of constant amplitude are developed at controllector electrodes 63 and 64; in other words, the clipping level of the synchronizing-signal separator is automatically adjusted in spite of varying signal strengths at the receiver input. The direct voltage-to-alternating voltage transmission ratio of the voltage-divider network comprising resistors 86 and 87 and condenser 88 may be adjusted to a value of less than unity to preclude receiver paralysis under certain abnormal operating conditions, as described and claimed in the copending application of John G. Spracklen, Serial No. 259,063, filed November 30, 1951, for "Television Receiver," and assigned to the present assignee.

The operation of beam deflection oscillator tube 24, and its role in providing discharge pulses to the input of sweep amplifier tube 106 in accordance with the present invention, has already been described in connection with the more general embodiment of Figure 1. In the specific circuit arrangement shown in Figure 6, however, an important additional feature has been incorporated. In order to accelerate the rise time or the slope of the leading edge of the discharge pulse and stabilize the time duration of the discharge pulse against variations in the adjustment of the positive or regenerative feedback has been provided from output anode 70 and/or a subsequent point in the scanning system to one or more beam-controlling electrodes of beam deflection tube 24. Thus, condenser 111 and resistor 112 constitute a regenerative feedback circuit from output anode 70 to deflector 74; the drop in potential of anode 70 as the storage condenser 50 is discharged through the electron beam results in a corresponding drop in the potential of deflector 74, thus effectively repelling the beam onto output anode 70 at a more rapid rate. At the same time, positive voltage pulses appearing at tap 113 of output transformer 107 in synchronism with the discharge pulses are applied to accelerating electrode 69, thus effectively increasing the amount of beam current during the discharge period and thereby effectively increasing the slope of the leading edge of the discharge pulse while conforming the duration of the discharge pulse to that of the flyback pulse which in turn is determined almost entirely by the circuit constants in the sweep output system. In this manner, precise control of the initiation of the scanning waveform is achieved.

Additional or alternative regenerative feedback circuits may also be provided if desired. For example, if an auxiliary deflector is included in beam deflection oscillator tube 24 for the purpose of providing control over picture centering, in the manner described and claimed in copending application Serial No. 272,200, suitably phased pulses of proper polarity may be applied to such auxiliary deflector from the sweep output. Also regenerative feedback may be provided if desired from passive anode 71 to the opposite deflector 73, in a manner analogous to the regenerative feedback from output anode 70 to deflector 74. These expedients further tend to sharpen the leading edge of the discharge pulse applied to line-frequency sweep amplifier 106.

While the invention is of particular utility in connection with a synchronizing system employing a special purpose electron discharge device of the type described, the invention may also be employed to advantage in receivers provided with other types of automatic-frequency-control and automatic-gain-control systems operating in conjunction with a beam-deflection power tube constructed in the manner of the left-hand section of the device of Figure 2. For example, the automatic-frequency-control system may comprise a completely conventional double-diode balanced phase detector, and the automatic-gain-control system may be of a conventional type employing an amplitude-delay biased diode or triode rectifier which may be time gated if desired. Moreover, the negative bias voltage developed at the gating electrode may be applied to any direct-voltage utilization circuit requiring a negative energizing potential. Finally, it is not essential that the gating signal be applied to a focusing electrode; any electrode exerting an intensity-control influence on the electron beam of the power tube, either in the form of a slotted plate or a mesh grid, may be employed for this purpose, although it is preferred that the gating electrode be disposed closely adjacent the cathode emissive surface in the embodiment in which it is desired to employ the gating electrode in the generation of a negative bias potential.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. In a television receiver: an image-reproducing device; a scanning system associated with said image-reproducing device; a source of composite video signals including video-signal components and synchronizing-signal components; means coupled to said scanning system for developing a comparison signal in fixed phase relation with the scansion of said image-reproducing device; phase comparison means coupled to said composite video signal source and to said comparison signal developing means for generating a unidirectional control potential indicative of the phase relation between said synchronizing-signal components and said scansion; an electron-discharge device comprising a cathode for projecting an electron stream, a control system, and an anode system including an output anode; means for applying said unidirectional control potential and a periodic signal having a fixed phase relation with said scansion to said control system; a wave-shaping network including an energy-storage device; a charging circuit coupled to said wave-shaping network for charging said energy-storage device; means coupling said wave-shaping network to said output anode to periodically discharge said energy-storage device through said electron stream; and means coupling said wave-shaping network to said scanning system to control said scansion in accordance with said periodic discharge of said energy-storage device.

2. In a television receiver: an image-reproducing device; a scanning system associated with said image-reproducing device; a source of composite video signals including video-signal components and synchronizing-signal components; means coupled to said scanning system for developing a comparison signal in fixed phase relation with the scansion of said image-reproducing device; phase comparison means coupled to said composite video signal source and to said comparison signal developing means for generating a unidirectional control potential indicative of the phase relation between said synchronizing-signal components and said scansion; a beam deflection tube comprising an electron gun for projecting an electron beam, a deflection-control system, and an anode system including an output anode; means for applying said unidirectional control potential and a periodic signal having a fixed phase relation with said scansion to said deflection-control system; a wave-shaping network including an energy-storage device; a charging circuit coupled to said wave-shaping network for charging said energy-storage device; means coupling said wave-shaping network to said output anode to periodically discharge said energy-storage device through said electron beam; and means coupling said wave-shaping network to said scanning system to control said scansion in accordance with said periodic discharge of said energy-storage device.

3. In a television receiver: an image-reproducing device; a scanning system associated with said image-reproducing device; a source of composite video signals including video-signal components and synchronizing-signal components; means coupled to said scanning system for developing a comparison signal in fixed phase relation with the scansion of said image-reproducing device; phase comparison means coupled to said composite video signal source and to said comparison signal developing means for generating a unidirectional control potential indicative of the phase relation between said synchronizing-signal components and said scansion; a beam deflection tube comprising an electron gun for projecting an electron beam, a deflection-control system, and an anode system including an output anode; means for applying said comparison signal and said unidirectional control potential to said deflection-control system; a wave-shaping network including an energy-storage device; a charging circuit coupled to said wave-shaping network for charging said energy-storage device; means coupling said wave-shaping network to said output anode to periodically discharge said energy-storage device through said electron beam; and means coupling said wave-shaping network to said scanning system to control said scansion in accordance with said periodic discharge of said energy-storage device.

4. In a television receiver: an image-reproducing device; a scanning system associated with said image-reproducing device; a source of composite video signals including video-signal components and synchronizing-signal components; means coupled to said scanning system for developing a comparison signal in fixed phase relation with the scansion of said image-reproducing device; phase comparison means coupled to said composite video signal source and to said comparison signal developing means for generating a unidirectional control potential indicative of the phase relation between said synchronizing-signal components and said scansion; an electron-discharge device comprising a cathode for projecting an electron stream, a control system, and an anode system including an output anode; means for applying a periodic signal having a fixed phase relation with said scansion to said control system; a wave-shaping network including an energy-storage device; a charging circuit coupled to said wave-shaping network for charging said energy-storage device; means coupling said wave-shaping network to said output anode to periodically discharge said energy-storage device through said electron stream to provide periodic output pulses; means for applying said unidirectional control potential to said control system to vary the phase relation between said periodic signal and said output pulses; and means coupling said wave-shaping network to said scanning system to control said scansion in accordance with said output pulses.

5. In a television receiver: an image-reproducing device; a scanning system associated with said image-reproducing device; a source of composite video signals including video-signal components and synchronizing-signal components; means coupled to said scanning system for developing a comparison signal in fixed phase relation with the scansion of said image-reproducing device; a balanced phase detector coupled to said composite video signal source and to said comparison signal developing means for generating a balanced unidirectional control potential indicative of the phase relation between said synchronizing-signal components and said scansion; a beam deflection tube comprising an electron gun for projecting an electron beam, a deflection-control system including a pair of electrostatic-deflection electrodes, and an anode system including an output anode; means for applying said balanced unidirectional control potential and a periodic signal having a fixed phase relation with said scansion between said electrostatic-deflection electrodes; a wave-shaping network including an energy-storage device; a charging circuit coupled to said wave-shaping network for charging said energy storage device; means coupling said wave-shaping network to said output anode to periodically discharge said energy-storage device through said electron beam; and means coupling said wave-shaping network to said scanning system to control said scansion in accordance with said periodic discharge of said energy-storage device.

6. In a television receiver: an image-reproducing device; a scanning system associated with said image-reproducing device; a source of composite video signals including video-signal components and synchronizing-signal components; means coupled to said scanning system for developing a comparison signal in fixed phase relation with the scansion of said image-reproducing device; a balanced phase detector having a pair of output electrodes; means coupling said composite video signal source and said comparison signal developing means to said balanced phase detector, whereby a balanced unidirectional control potential indicative of the phase relation between said synchronizing signal components and said scansion is developed between said output electrodes; a beam deflection tube comprising an electron gun for projecting an electron beam, a deflection-control system including a pair of electrostatic-deflection electrodes, and an anode system including an output anode; means direct-coupling said output electrodes to said electrostatic-deflection electrodes to apply said comparison signal and said unidirectional control potential to said deflection-control system; a wave-shaping network including an energy-storage device; a charging circuit coupled to said wave-shaping network to said output anode to periodically discharge said energy-storage device through said electron beam; and means coupling said wave-shaping network to said scanning system to control said scansion in accordance with said periodic discharge of said energy-storage device.

7. In a television receiver: an image-reproducing device; a scanning system associated with said image-reproducing device; a source of composite video signals including video-signal components and synchronizing-signal components; means coupled to said scanning system for developing a comparison signal in fixed phase relation with the scansion of said image-reproducing device; phase comparison means coupled to said composite video signal source and to said comparison signal developing means for generating a unidirectional control potential indicative of the phase relation between said synchronizing-signal components and said scansion; an electron-discharge device comprising a cathode for projecting an electron stream, an intensity-control electrode, a deflection-control system, and an anode system including an output anode; means for applying a periodic signal having a fixed phase relation with said scansion to said deflection-control system; a wave-shaping network including an energy-storage device; a charging circuit coupled to said wave-shaping network for charging said energy-storage device; means coupling said wave-shaping network to said output anode to periodically discharge said energy storage device through said electron stream to provide periodic output pulses having a repetition frequency corresponding to twice the frequency of said scansion; means coupled to said scanning system for applying a gating signal to said intensity-control electrode to interrupt the flow of space current to said anode system during a major portion of each scanning cycle, thereby effectively eliminating alternate ones of said output pulses; means for applying said unidirectional control potential to said deflection-control system to vary the phase relation between said periodic signal and said output pulses; and means coupling said wave-shaping network to said scanning system to control said scansion in accordance with said output pulses.

8. In a television receiver: an image-reproducing device; a scanning system associated with said image-reproducing device; a source of composite video signals including video-signal components and synchronizing-signal components; means coupled to said scanning system for developing a comparison signal in fixed phase relation with the scansion of said image-reproducing device; phase comparison means coupled to said composite video signal source and to said comparison signal developing means for generating a unidirectional control potential indicative of the phase relation between said synchronizing-signal components and said scansion; an electron-discharge device comprising a cathode for projecting an electron stream, a control system, and an anode system including an output anode; means for applying said unidirectional control potential and a periodic signal having a fixed phase relation with said scansion to said control system; a wave-shaping network including an energy-storage device; a charging circuit coupled to said wave-shaping network for charging said energy-storage device; means coupling said wave-shaping network to said output anode to periodically discharge said energy-storage device through said electron stream; a regenerative feedback circuit coupled to said control system for effectively accelerating said discharge of said energy-storage device; and means coupling said wave-shaping network to said scanning system to control said scansion in accordance with said periodic discharge of said energy-storage device.

9. In a television receiver: an image-reproducing device; a scanning system associated with said image-reproducing device; a source of composite video signals including video-signal components and synchronizing-signal components; means coupled to said scanning system for developing a comparison signal in fixed phase relation with the scansion of said image-reproducing device; phase comparison means coupled to said composite video signal source and to said comparison signal developing means for generating a unidirectional control potential indicative of the phase relation between said synchronizing-signal components and said scansion; a beam deflection tube comprising an electron gun for projecting an electron beam, a deflection-control system, and an anode system including an output anode; means for applying said unidirectional control potential and a periodic signal having a fixed phase relation with said scansion to said deflection-control system; a wave-shaping network including an energy-storage device; a charging circuit coupled to said wave-shaping network for charging said energy-storage device; means coupling said wave-shaping network to said output anode to periodically discharge said energy-storage device through said electron beam; a regenerative feedback circuit coupled from said output anode to said deflection-control system for effectively accelerating said discharge of said energy-storage device; and means coupling said wave-shaping network to said scanning system to control said scansion in accordance with said periodic discharge of said energy-storage device.

10. In a television receiver: an image-reproducing device; a scanning system associated with said image-reproducing device; a source of composite video signals including video-signal components and synchronizing-signal components; means coupled to said scanning system for developing a comparison signal in fixed phase relation with the scansion of said image-reproducing device; phase comparison means coupled to said composite video signal source and to said comparison signal developing means for generating a unidirectional control potential indicative of the phase relation between said synchronizing-signal components and said scansion; a beam deflection tube comprising a cathode and an accelerating electrode for projecting an electron beam, a deflection-control system, and an anode system including an output anode; means for applying said unidirectional control potential and a periodic signal having a fixed phase relation with said scansion to said control system; a wave-shaping network including an energy-storage device; a charging circuit coupled to said wave-shaping network for charging said energy-storage device; means coupling said wave-shaping network to said output anode to periodically discharge said energy-storage device through said electron beam to provide periodic output pulses; a regenerative feedback circuit coupled from said scanning system to said accelerating electrode for applying positive-polarity voltage pulses to said accelerating electrode in substantial synchronism with said output pulses, thereby effectively accelerating said discharge of said energy-storage device; and means coupling said wave-shaping network to said scanning system to control said scansion in accordance with said periodic discharge of said energy-storage device.

References Cited in the file of this patent

UNITED STATES PATENTS

| | | |
|---|---|---|
| 2,211,860 | Plaistowe | Aug. 20, 1940 |
| 2,656,414 | Roschke et al. | Oct. 20, 1953 |
| 2,684,404 | Adler | July 20, 1954 |